June 4, 1963

A. F. PILLSBURY, JR 3,091,794

TAPE CLEANING APPARATUS

Filed Feb. 21, 1961

ALBERT F. PILLSBURY, JR.
INVENTOR.

BY Robert G. Clay

ATTORNEY

United States Patent Office 3,091,794

Patented June 4, 1963

3,091,794
TAPE CLEANING APPARATUS

Albert F. Pillsbury, Jr., Palo Alto, Calif., assignor to Ampex Corporation, Redwood City, Calif., a corporation of California Filed Feb. 21, 1961, Ser. No. 90,866
10 Claims. (Cl. 15—308)

This invention relates to tape transports, and particularly to means for cleaning tape in movement on such transports.

Previously in the magnetic tape recording art there have been devised tape cleaners for removing dust and debris occasioned by wear of the magnetic oxide surface of the tape against portions of the transport apparatus. Such removal is of the greatest importance because otherwise the debris acts as an abrasive to cause increased wear. Also, the debris tends to cake in available hollows in the surface of the tape and between the transducer heads, thereby spoiling the operation performance and even changing the magnetic characteristics of the various elements. However, in the past, cleaners have generally been arranged so that when the tape is subjected to transient variations in tension, as in stopping and starting, the cleaning element may gouge into the tape in a destructive manner, or the pressure between the tape and cleaner is at least sufficiently increased so as to cause excessive wear, stretching and distortion of the tape.

Accordingly, it is an object of the present invention to provide an apparatus for cleaning a tensioned tape in movement but without damaging the tape during transient variations of the tape tension.

It is another object of the invention to provide a tape cleaning apparatus for positively dislodging debris adhering to the tape and for positively moving the debris to a collecting zone remote from the tape.

It is still another object of the invention to provide a tape cleaning apparatus that is self-cleaning in operation so that debris removed from the tape does not accumulate on the apparatus for possible transfer back to the tape or to other portions of the transport mechanism.

In accordance with the present invention a tape cleaning apparatus is provided wherein the tape in movement is conducted by a pair of spaced guides so that the tension of the tape causes it to extend tautly on a straight path between the guides. A pneumatic suction device (i.e., a pressure-differential device) is positioned between the guides and is spaced from the straight path, so that when the suction is turned on, the tape is pulled out of the straight path and against the suction device. The suction device removes loose debris from the tape. Debris that adheres to the tape is scraped off by blades formed on the suction device, so that such debris is also removed by the suction. Whenever the tape tension increases transiently, the tape tends to pull away from the scraping blades so that gouging is avoided.

The invention will be described in greater detail in conjunction with the accompanying drawing, in which.

Figure 1:
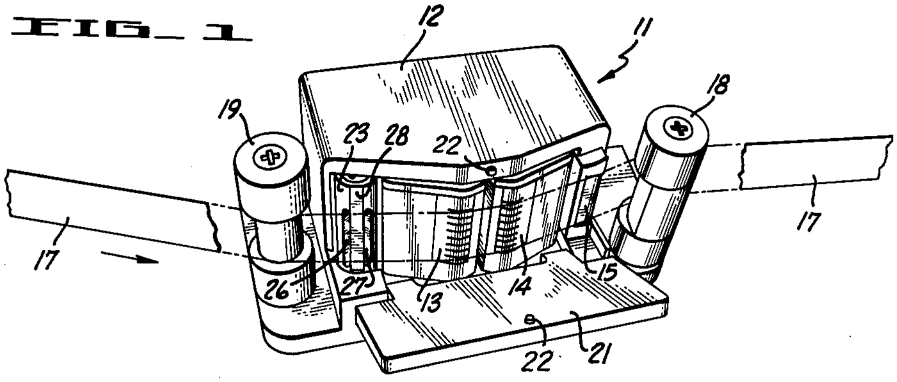
FIGURE 1 is a perspective view of a typical tape transport head assembly including a cleaner constructed in accordance with the invention.

Referring now to FIGURE 1 there is shown a typical magnetic tape transducing head assembly 11 such as is customarily mounted on the face plate and between the tape reels (not shown) of a tape transport. The assembly 11 includes a housing 12 enclosing a recording head 13, a playback head 14, and a third transducer 15, past which a tape 17 is guided under tension as by means of a pair of guide posts 18 and 19. The heads 13 and 14 are arranged to project substantially forwardly of the plane between the tape guiding surfaces of guides 18 and 19 so that the tension of the tape constrains the tape to closely engage the heads 13 and 14 in passage. The transducer 15 is positioned slightly forwardly of the plane between head 14 and the guiding surface of guide 18 so that the tension of the tape also keeps the tape in close contact with transducer 15. A hinged housing cover 21 is provided for covering the heads and tape during operation to protect them from damage, the cover 21 being shown in the drawing in the open position for clarity. Projections 22 on the housing 12 and cover 21 keep the cover 21 spaced substantially away from the heads and tape when the cover is closed.

Within the housing 12 and between the head 13 and the guide 19 there is mounted a tape cleaning element 23, here shown as a suction tube provided with a pair of parallel slots 26 and 27 along the length thereof, between which is formed a flat tape engaging land 28.

Figure 2:
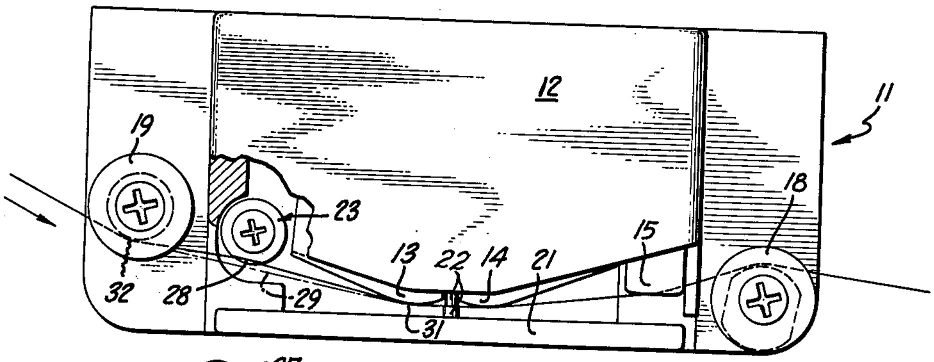
FIGURE 2 is a cut-away plan view, to an enlarged scale, of the assembly of FIGURE 1.

Referring now to FIGURE 2, the cleaning element 23 is shown to be positioned so that the tape engaging land 28 is spaced substantially away from the plane 29 between the tape engaging surfaces 31 and 32 of the head 13 and guide 19, respectively. Thus, it will be seen that when there is no suction in the element 23, the tape is constrained by its own tension to tend to follow a path lying in the plane 29, not engagng the land 28. However, the lower portion of the element 23 is connected to a vacuum source (not shown), so that when the source is operating the tape is pulled away from the plane 29 and against the land 28 for cleaning action.

It will be understood that the cleaning element 23 might be mounted at any point along the tape path, so long as it is between a pair of supports and spaced from the normal path of the tape between the supports; that the supports need not include the head 13; and that the cleaning element 23 need not be mounted in the head assembly 11 to be effective in its cleaning action. The mounting of the element 23 in the head assembly 11 as here shown is only exemplary.

Figure 3:
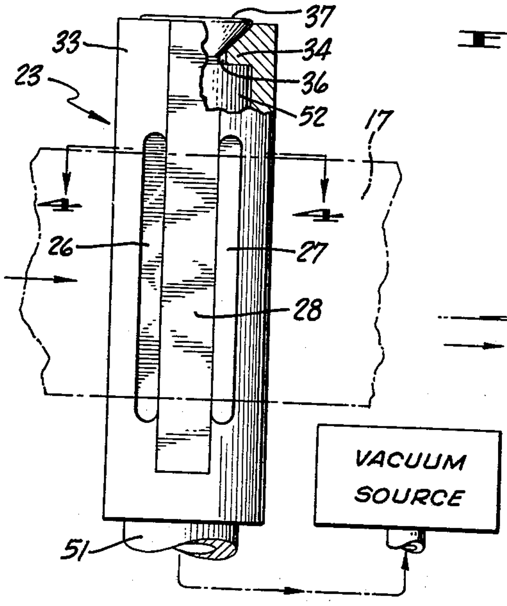
FIGURE 3 is a cut-away elevation view, to a further enlarged scale, of a portion of the apparatus of FIGURES 1 and 2.
Figure 4:
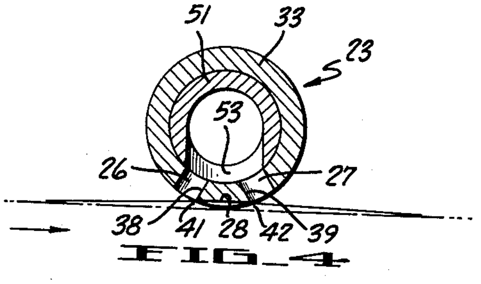
FIGURE 4 is a cross-sectional view taken substantially on the plane of lines 4—4 of FIGURE 3.

Referring now to FIGURES 3 and 4, the element 23 is shown in detail and is formed with an outer tube 33 having an inwardly directed flange 34 at the upper end to define a counter-sunk opening 36 for seating an assembly bolt 37. The slots 26 and 27 are radially directed in passage through the wall of the tube 33 so that the land 28 defines, with the adjacent slot walls 38 and 39, a pair of sharp-edged scraping blades 41 and 42. The scraping blade 41 serves to scrape adhering material from the tape 17 when the tape is moving in the direction of the arrow, and the blade 42 serves to scrape adhering material when the tape is moving in a reverse direction.

An inner sleeve 51 also formed as a hollow tube but with a closed upper end 52 is fitted within the tube 33, so that the end 52 of the sleeve bears against the flange 34 and is locked against the flange by means of the bolt 37 threaded into the sleeve end 52. The lower end of the sleeve 51 extends below the tube 33 and serves as the connection of the cleaning element to the vacuum source. The sleeve 51 has an opening 53 in the side wall thereof facing and communicating with the slots 26 and 27 of the tube 33, so that when the vacuum source is operating there is free passage of air and debris from the tape and through the slots 26 and 27 and the opening 53 into the bore of sleeve 51 and downwardly away to a collecting vessel (not shown) in the vicinity of the vacuum source.

In operation, the suction acting through the slots 26 and 27 pulls the moving tape out of the plane 29 and against the land 28 so that debris adhering to the tape is scraped away by the blade 41 (when the tape is moving in the direction of the arrow), and all the debris is sucked away through the slot 26 to the collecting vessel. The debris cleaned from the tape is thus positively removed and is not left around to encumber other portions of the transport apparatus. The device is also self-cleaning in that debris scraped from the tape by the blade 41 is not permitted to build up on the plate to decrease the sharpness of the edge thereof. As an important feature of the invention, whenever the tape tension is transiently increased, as in starting and re-starting, the tape is automatically urged to return toward the plane 29 and is at least slightly pulled away from the sharp edges of the blades 41 and 42 so as to avoid gouging of the tape by the blades.

It will be seen that if the tape is to be cleaned while moving in one direction only, then only one of the slots 26—27 is needed and only one of the blades 41—42. It will also be seen that a second cleaning element 23 may be mounted in the head assembly 11, as for example in place of the transducer 15, so that no matter which direction the tape is moved in, it is cleaned both immediately before and immediately after crossing the heads 13 and 14.

Thus there has been described a tape cleaning apparatus including a pair of spaced support elements (the head 13 and the guide 19) for engaging and tautly extending a tensioned tape in movement, and a pneumatic cleaning and scraping element positioned between the two supports and spaced from the normal path of the tape, so as to pull the tape out of its normal path and against the scraping portion of the element, the apparatus acting to scrape and suck away debris from the tape in passage and to avoid gouging the tape when the tension thereof is transiently increased.

What is claimed is:

1. A tape cleaning apparatus for a transport of the class wherein a tensioned tape is moved along a first predetermined path between a pair of spaced support elements, said apparatus comprising: means mounted on said transport and applying a predetermined force for urging said tape out of said first path between said elements and into a second predetermined path laterally displaced therefrom; and a non-resilient scraping member mounted on said transport and provided with a smooth tape-engaging surface for engagement with said tape in said second path, said member also being provided with a scraping blade defining an edge of said surface on the side thereof that is upstream with respect to the direction of tape motion on said second path; whereby an excess of tension in said tape overcomes said predetermined urging force and damage to said tape is avoided.

2. A tape cleaning apparatus for a transport of the class wherein a tensioned tape is moved along a predetermined first path between a pair of spaced support elements, said apparatus comprising: means mounted on said transport for establishing an air pressure of differential decreasing from said first path toward a second predetermined path laterally displaced therefrom, so as to urge said tape out of said first path between said elements and into said second path; and a non-resilient scraping member mounted on said transport and provided with a smooth tape-engaging surface for engagement with said tape in said second path, said member also being provided with a scraping blade defining an edge of said surface on the side thereof that is upstream with respect to the direction of tape motion on said second path; whereby an excess of tension in said tape does not cause said tape to be engaged with increased pressure on said scraping blade, and damage to said tape is avoided.

3. A tape cleaning apparatus for a transport of the class wherein a tensioned tape is moved along a predetermined path between a pair of spaced support elements, said apparatus comprising: a scraper for removing unwanted material from said tape, said scraper having a flat land portion and defining at least one scraping edge and being mounted on said transport in laterally spaced relation to said path between said elements with said flat land portion substantially parallel to said path; and means mounted on said transport for establishing an air pressure differential decreasing from said path toward said scraper so as to urge said tape out of said path between said elements and into flat cleaning engagement with said scraper land portion whereby an excess of tension in said tape causes said tape to be disengaged from said scraper, and damage to said tape is avoided.

4. A tape cleaning apparatus for a transport of the class wherein a tensioned tape is moved along a predetermined path between a pair of spaced support elements, said apparatus comprising: a scraper for removing unwanted material from said tape, said scraper being mounted on said transport in laterally spaced relation to said path between said elements, said scraper being provided with a scraping edge portion on the side thereof facing the direction from which said tape is moving; and means mounted on said transport for establishing an air pressure differential decreasing from said path toward and around and beyond said scraping edge portion of said scraper, whereby said moving tape is urged away from said path and into intimate engagement with said scraping edge portion and said unwanted material is scraped from said tape by said scraping edge portion and is further drawn away from said scraping edge portion by the action of said air pressure differential, and whereby an excess of tension in said tape causes said tape to be pulled away from said scraping edge portion against the action of said air pressure differential so as to avoid gouging of said tape by said scraping edge portion.

5. A tape cleaning apparatus for a transport of the class wherein a tensioned tape is moved alternately in opposite directions along a predetermined path between a pair of spaced support elements, said apparatus comprising: a scraper for removing unwanted material from said tape, said scraper being mounted on said transport in laterally spaced relation to said path between said elements, said scraper being provided with a pair of scraping edge portions on opposite sides thereof facing the two directions from which said tape is alternately moved; and means mounted on said transport for establishing an air pressure differential decreasing from said path toward and around and beyond said scraping edge portions of said scraper, whereby said tape in either direction of movement is urged away from said path and into intimate engagement with said scraping edge portions for removal of said unwanted material, and whereby an excess of tension in said tape causes retraction of said tape from said scraping edge portions.

6. A tape cleaning apparatus for a transport of the class wherein a tensioned tape is moved along a predetermined path between a pair of spaced support elements, said apparatus comprising: a hollow tube having a cylindrical side wall and provided with at least one opening in said side wall thereof defining at least one scraping edge portion of said side wall, said tube being mounted on said transport between said support elements with the generatrices of said side wall transverse to the length of said tape, and with said opening facing said path and spaced substantially therefrom; and a vacuum source coupled to an end of said tube so as to establish an air pressure differential decreasing away from said path and toward and through said opening, whereby said tape is drawn against said tube at said opening for scraping and suction removal of unwanted material, and whereby an excess of tension in said tape causes said tape to be disengaged from said tube.

7. A tape cleaning apparatus for a transport of the class wherein a tensioned tape is moved along a predetermined path between a pair of spaced support elements, said apparatus comprising: a hollow tube having a cylindrical side wall and provided with one closed end, one open end and an elongated opening in said side wall along the length of said tube defining at least one scraping edge portion of said side wall, said tube being mounted on said transport between said support elements with the generatrices of said side wall transverse to the length of said tape, and with said opening facing said path and spaced substantially therefrom; and a vacuum source coupled to the open end of said tube so as to establish an air pressure differential decreasing away from said path and toward and through said opening, whereby said tape is drawn against said tube at said opening for scraping and suction removal of unwanted material, and whereby an excess of tension in said tape causes said tape to be disengaged from said tube.

8. A tape cleaning apparatus for a transport of the class wherein a tensioned tape is moved along a predetermined path between a pair of spaced support elements, said apparatus comprising: a hollow tube provided with one closed end, one open end and a pair of elongated parallel openings along the length of said tube and on the same side thereof defining at least two scraping edge portions of said tube, said tube being flattened between said openings to present a tape-engaging land, said tube being mounted on said transport between said support elements, with the axis of said tube transverse to the length of said tape, and with said openings and land facing said path and spaced substantially therefrom; and a vacuum source coupled to the open end of said tube so as to establish an air pressure differential decreasing away from said path and toward and through said openings, whereby said tape is drawn against said land for scraping and suction removal of unwanted material, and whereby an excess of tension in said tape causes said tape to be disengaged from said land.

9. An apparatus as described in claim 8, wherein said openings are substantially radially-directed in said tube, whereby the edge portions of said land adjacent said openings are sharpened to define a pair of scraping edges.

10. In a tape cleaner, the combination comprising: a hollow tube provided with one closed end, one open end, and a pair of elongated parallel openings along the length of said tube and on the same side thereof, said openings being radially directed through the wall of said tube, and said tube being cut away to define a flat land surface between said openings for engaging said tape, and to define with adjacent walls of said openings a pair of sharp-edged scraping blades for said tape.

References Cited in the file of this patent

UNITED STATES PATENTS

| | | |
|---|---|---|
| 418,804 | Miller | Jan. 7, 1890 |
| 1,926,306 | Pettersen | Sept. 12, 1933 |
| 1,933,084 | Allison | Oct. 31, 1933 |
| 2,934,394 | Emslie et al. | Apr. 26, 1960 |
| 2,994,903 | Lawrance et al. | Aug. 8, 1961 |
| 3,035,295 | Buslik et al. | May 22, 1962 |